United States Patent [19]

Sakakibara et al.

[11] Patent Number: 4,976,347

[45] Date of Patent: Dec. 11, 1990

[54] ACTUATOR FOR FRICTION ENGAGEMENT DEVICE

[75] Inventors: Shiro Sakakibara; Takaharu Fukaya, both of Anjo, Japan

[73] Assignee: Aisin Aw Co., Ltd., Anjo, Japan

[21] Appl. No.: 281,353

[22] Filed: Dec. 8, 1988

[30] Foreign Application Priority Data

Dec. 10, 1987 [JP] Japan .................................. 62-313896

[51] Int. Cl.$^5$ ...................... F16D 27/00; F16D 43/04; B60K 17/35
[52] U.S. Cl. ...................................... 192/20; 180/249; 192/84 R; 192/93 A; 192/94
[58] Field of Search ...................... 192/20, 84 R, 93 A, 192/94; 180/249

[56] References Cited

U.S. PATENT DOCUMENTS

| 3,235,045 | 2/1966 | Pop | 192/94 X |
| 4,781,266 | 11/1988 | Hotta et al. | 192/103 F X |
| 4,821,604 | 4/1989 | Asano | 192/103 F X |

FOREIGN PATENT DOCUMENTS 513823 12/1930 Fed. Rep. of Germany ........ 192/20

Primary Examiner—Rodney H. Bonck
Attorney, Agent, or Firm—Varndell Legal Group

[57] ABSTRACT

Disclosed is an actuator for a friction engagement device of the type adapted to allow power transmission between two shafts by releasing engagement of the friction engagement device concerned. The actuator comprises a torque/thrust conversion device composed of two elements and adapted to effect and release the engagment of the friction engagement device, a pair of gears respectively connected to the two elements, and a torque generating mechanism gear which is engaged with the pair of gears, the gear ratio between the torque generating mechanism gear and one of the pair of gears being slightly different from that between the torque generating mechanism gear and the other of the pair of gears. In this arrangement, the motor torque is directly converted into the power for effecting and releasing the engagement of the friction engagement device, whereby the control method is simplified and the response to the control signal expedited.

9 Claims, 10 Drawing Sheets

ACTUATOR FOR FRICTION ENGAGEMENT DEVICE

BACKGROUND OF THE INVENTION

This invention relates to an actuator for a motor-driven friction engagement device which does not utilize hydraulic pressure.

FIG. 13 shows a wet multiple disc clutch as an example of a conventional friction engagement device. In the wet multiple disc clutch shown, a clutch hub 102 is attached to the outer peripheral section of an input shaft 101 which is connected to driving means. A plurality of clutch discs 103 are provided around the clutch hub 102. A clutch drum 104 is rotatably supported around the input shaft 101. At one end of this clutch drum 104, a drive gear 105 is provided, and at the other, a plurality of clutch plates 106 are arranged between the clutch discs 103. A piston 108 is provided in the space defined by the clutch hub 102 and the clutch drum 104 through the intermediary of a return spring 107. The piston 108 is operated by supplying hydraulic pressure through an oil passage 109, which causes the clutch discs 103 and the clutch plates 106 to be friction-engaged with each other, thereby transmitting the torque of the input shaft 101 to the drive gear 105. By draining the hydraulic pressure of the oil passage 109, the piston 108 returns to the original position by virtue of the return spring 107, which causes the friction engagement of the clutch discs 103 and the clutch plates 106 to be released, so that the torque of the input shaft 101 ceases to be transmitted to the drive gear 105.

Generally speaking, the clamping force of this type of clutch, which is widely used as a control clutch, makes use of hydraulic pressure generated by its driving means. When controlling the clutch from outside, the hydraulic pressure is adjusted by means of various hydraulic pressure regulating valves, the desired hydraulic pressure control being effected by transmitting the right hydraulic pressure to the sections where it is required, through appropriate piping.

When a system is to be controlled from outside, an electrical signal is generally employed as the control signal. In the above-described conventional hydraulic actuator, however, oil is the hydraulic medium connecting the control signal, i.e., the electrical signal and the mechanical force for effecting the clutch engagement. As a result, problems arise from oil leakage through the piping, delay in response, impossibility of fine control, and a complicated mechanism, which lead to inadequate reliability.

In addition, the required hydraulic pressure is generally generated by driving an oil pump by means of a motor, which, however, is rarely used exclusively for the purpose of generating hydraulic pressure, so that some contrivance must be effected to make use of the hydraulic pressure. In some conventional actuators, an electric motor is exclusively used for the oil pump for generating hydraulic pressure. However, this causes a space problem. Moreover, it is not to be regarded as an efficient method, for it does not seem to be absolutely necessary to convert electrical energy, which is easy to control, into hydraulic energy.

SUMMARY OF THE INVENTION

It is accordingly an object of this invention to eliminate the above mentioned problems encountered in conventional actuators. In accordance with this invention, the motor torque is directly converted into the force for effecting and releasing the friction engagement, so that the control method is simplified and the response to the control signal expedited.

Another object of this invention is to simplify the mechanism and to improve the reliability of an actuator of this type by obviating the use of oil.

In order to attain these objects, the present invention provides an actuator for a friction engagement device of the type adapted to allow power transmission between two shafts by releasing engagement of the friction engagement device, comprising a torque/thrust conversion device composed of two elements and adapted to effect and release the engagement of the friction engagement device, a pair of gears respectively connected to said two elements, and a torque generating mechanism gear which is engaged with said pair of gears, the gear ratio between said torque generating mechanism gear and one of said pair of gears being slightly different from that between said torque generating mechanism gear and the other of said pair of gears.

As shown in FIG. 1, which illustrates an embodiment of this invention, the gear ratio between the gears 22 and 23 is different from that between the gears 22 and 24, so that, when the motor 21 rotates, the two hollow shafts 25 and 26 will rotate with a slight relative rotational movement. As a result, the motor torque increases between these two hollow shafts to a great extent, thereby generating an intensive thrust force by virtue of the cam surfaces 19, 20 and the roller 18, with which force the piston 28 is forced through the bearing 27 to bring the clutch 15 into the engaged state.

In other words, the motor torque is directly converted into the force for effecting and releasing the engagement of the friction engagement device, so that none of the driving force of the motor is wasted. Further, this makes it possible to control the motor directly on an electrical basis, which leads to a simpler control method and an expedited response to the control signal. In addition, since it uses no oil, the device in accordance with this invention can involve no oil leakage, which results in improved reliability as well as a simplified mechanism.

DETAILED DESCRIPTION OF THE PREFERRED EMBODIMENTS

Figure 2:
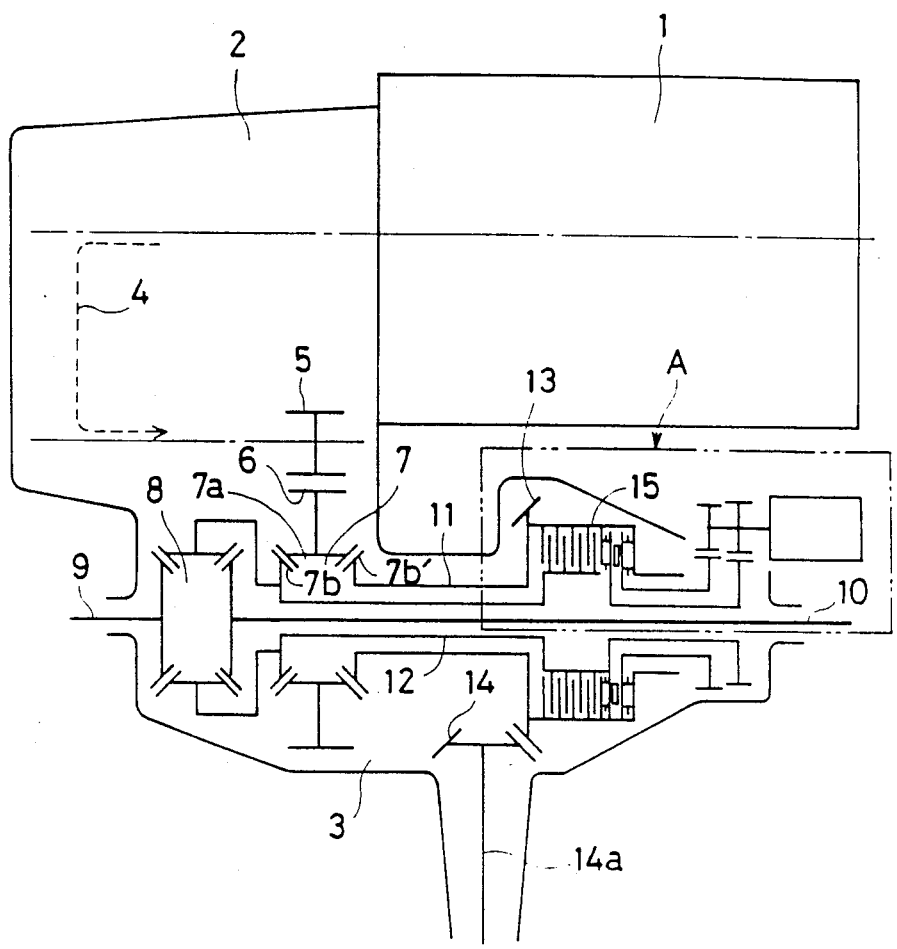
FIG. 2 shows an actuator in accordance with this invention as applied to a four-wheel drive vehicle with its differential gear located at the center.

FIG. 2 shows an embodiment of the actuator for a friction engagement device of this invention as applied to a four-wheel drive vehicle.

The drawing schematically illustrates the drive system when the engine is arranged on the front side. The output of an engine 1 is changed in speed through a transmission 2, and is transmitted, as indicated by the arrow 4, through an output gear 5 to an input gear 6 in a transfer section 3. The driving force input to the transfer section 3 is distributed to the front and rear wheels through a differential gear 7 located at the center. By virtue of a pinion 7a connected to the input gear 6 in the transfer section 3, the driving force is transmitted to the rear wheels through a side gear 7b', and to the front wheels through a side gear 7b, the differential gear 7 at the center serving to adjust the differential between the front and rear wheels. The side gear 7b through which the driving force is transmitted to the front wheels is connected to a front differential gear 8, the driving force being distributed, as with the differential gear at the center, to the left and right axles 9 and 10. The driving force transmitted through the side gear 7b' to the rear wheels is further transmitted through a transfer drive gear 13 connected to a hollow shaft 11 to a driven gear 14, the rear wheels being driven by virtue of a propeller shaft 14a.

Since in a four-wheel drive vehicle with a differential gear located at the center, idling of any one of the four wheels would result in all the other driven wheels not receiving any torque, a differential control section A for the differential gear at the center has to be provided in such a vehicle. In other words, the side gear 7b leading to the front wheels is also connected to the hollow shaft 11, and a multiple disc friction clutch 15 is provided between the side gear 7b and the hollow shaft 11 on the rear wheel side so as to enable the differential to be controlled.

Figure 1A:
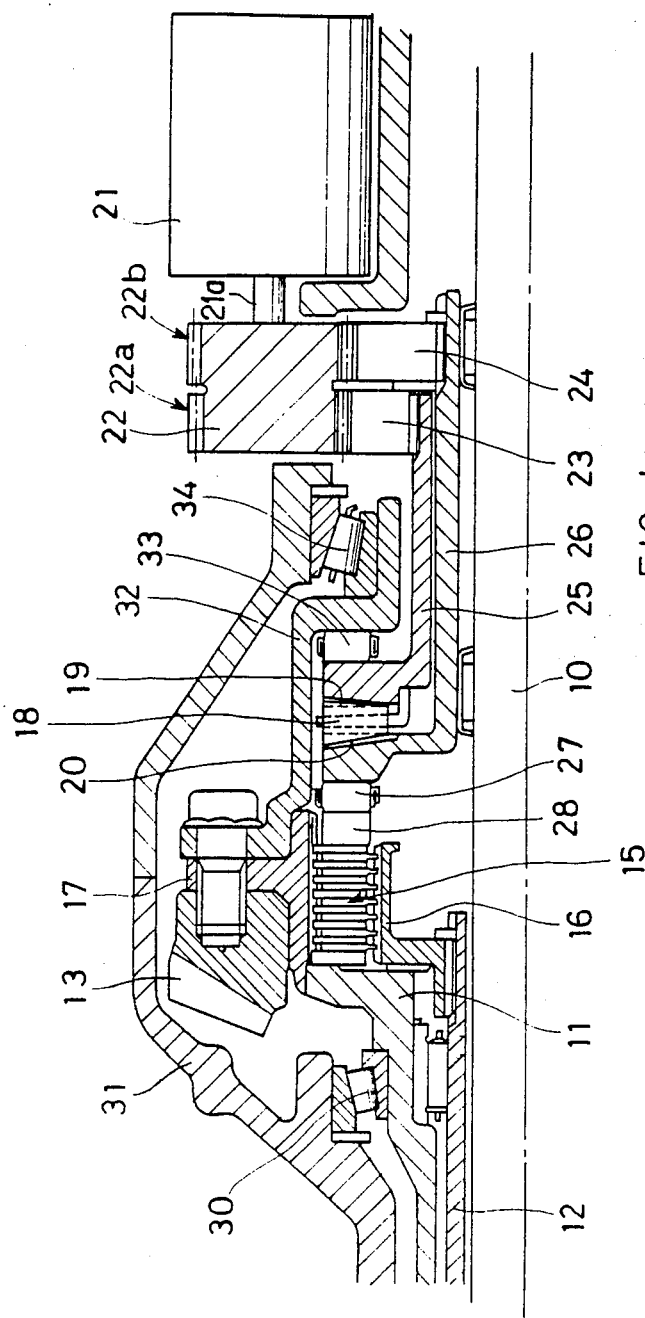
FIG. 1(a) is a sectional view showing an embodiment of the actuator in accordance with this invention.
Figure 1B:
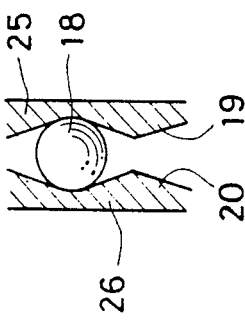
FIG. 1(b) is a partial view of the embodiment of FIG. 1(a)

FIG. 1 is a sectional view of an embodiment of the above differential control section A. The multiple disc friction clutch 15 is arranged between a clutch hub 16 connected to the front wheel side hollow shaft 12 and a clutch drum 17 connected to the rear wheel side hollow shaft 11. The pressurizing force of the multiple disc friction clutch 15 is provided by the torque of a motor 21. A gear 22 having two kinds of gear teeth 22a and 22b is attached to the output shaft 21a of the motor 21. The gear teeth 22a and 22b respectively engage with gears 23 and 24, to which hollow shafts 25 and 26 having respective cam surfaces 19 and 20 are respectively spline-connected through a roller 18. Further, a piston 28 is provided through the intermediary of a bearing 27. The above-mentioned rear wheel side hollow shaft 11 is supported by a transfer case 31 through the intermediary of a bearing 30. Fastened by means of bolts to the clutch drum 17 are the transfer drive gear 13 and a cover 32, which is supported between a hollow shaft 25 and the transfer case 31 by means of bearings 33 and 34. The motor employed may be an electric motor such as a pulse motor and a stepping motor, or an ultrasonic motor.

The operation of the device shown will now be described. When the motor 21 starts to rotate, the hollow shafts 25 and 26 will rotate with a slight relative rotational movement because the gear ratio between the gears 22 and 23 is slightly different from that between the gears 22 and 24. As a result, the motor torque increases to a great extent between these two shafts, thereby generating an intensive thrust force by virtue of the cam surfaces 19, 20 and the roller 18, with which force the piston 28 is forced through the bearing 27 to bring the clutch 15 into the engaged state. The then reaction is also received through the bearing 27.

Figure 3:
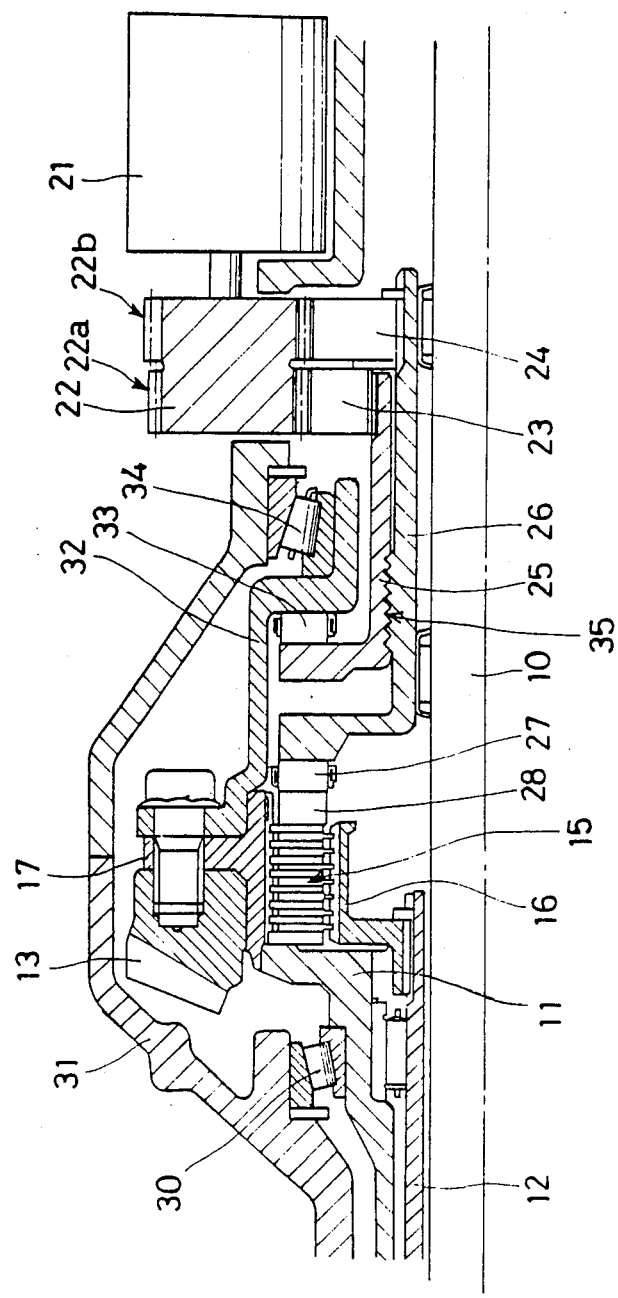
FIGS. 3 through 5 are sectional views of other embodiments of the actuator in accordance with this invention.
Figure 4:
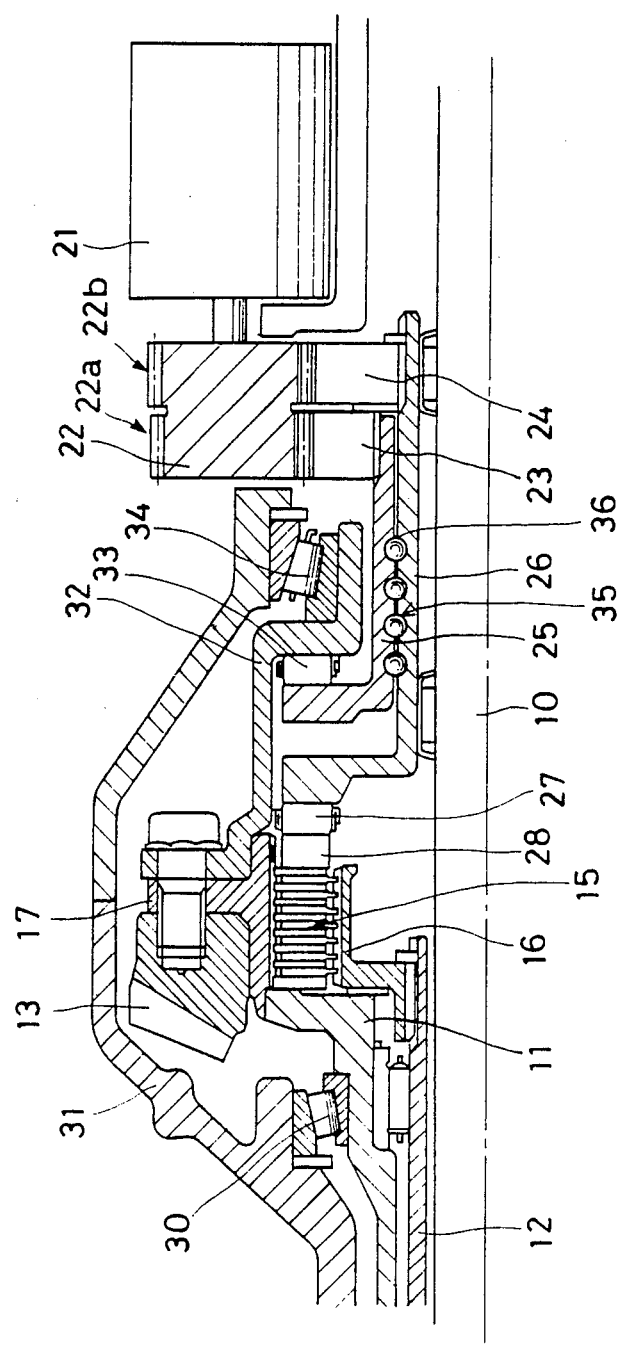

FIGS. 3 and 4 are sectional views showing other embodiments of the differential control section A. The components which are identical with those of FIG. 1 are referred to by the same reference numerals, an explanation of such components being omitted. In these embodiments, a screw mechanism 35 which serves as a motor torque/thrust conversion mechanism is provided between the hollow axes 25 and 26. The embodiment shown in FIG. 3 in which an ordinary screw is employed provides a holding function even if no torque is imparted to the motor because of the friction at the screw thread. The embodiment shown in FIG. 4 in which a ball screw 36 is employed provides no such holding function and operates in the same manner as the cam in the embodiment of FIG. 1.

Figure 5:
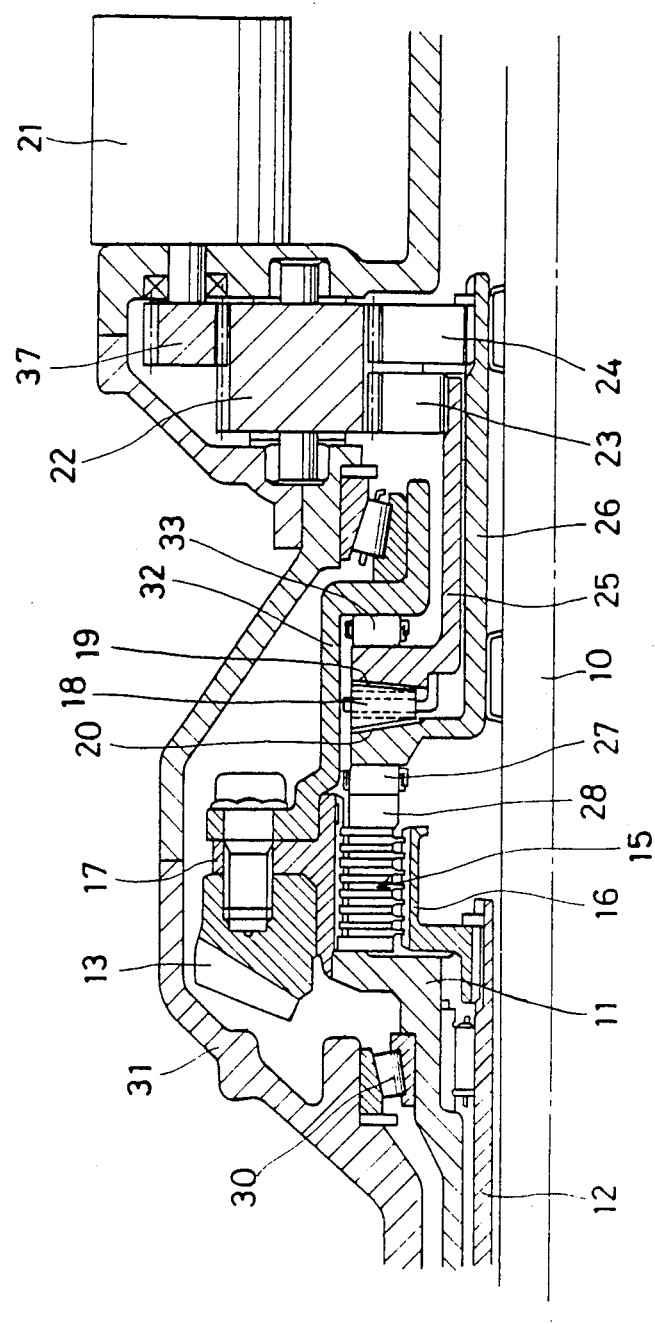

FIG. 5 shows still another embodiment of the differential control section A. This embodiment aims at improving the gear speed reduction ratio. A small torque of the motor may often result in limitations to the gear speed reduction ratio for various reasons related to strength, manufacturing processes, mechanism or the like. In view of this, this embodiment makes it possible to obtain a large speed reduction ratio by providing a smaller gear 37 which is driven by the motor 21. In accordance with this embodiment, a greater speed reduction ratio can be obtained by adopting various conventional methods of effecting speed reduction between the output shaft of the motor 21 and the axle of the gear 22. In this embodiment, a single kind of gear teeth are provided on the gear 22. Further, it goes without saying that this embodiment can be applied to those of FIGS. 3 and 4.

Figure 6:
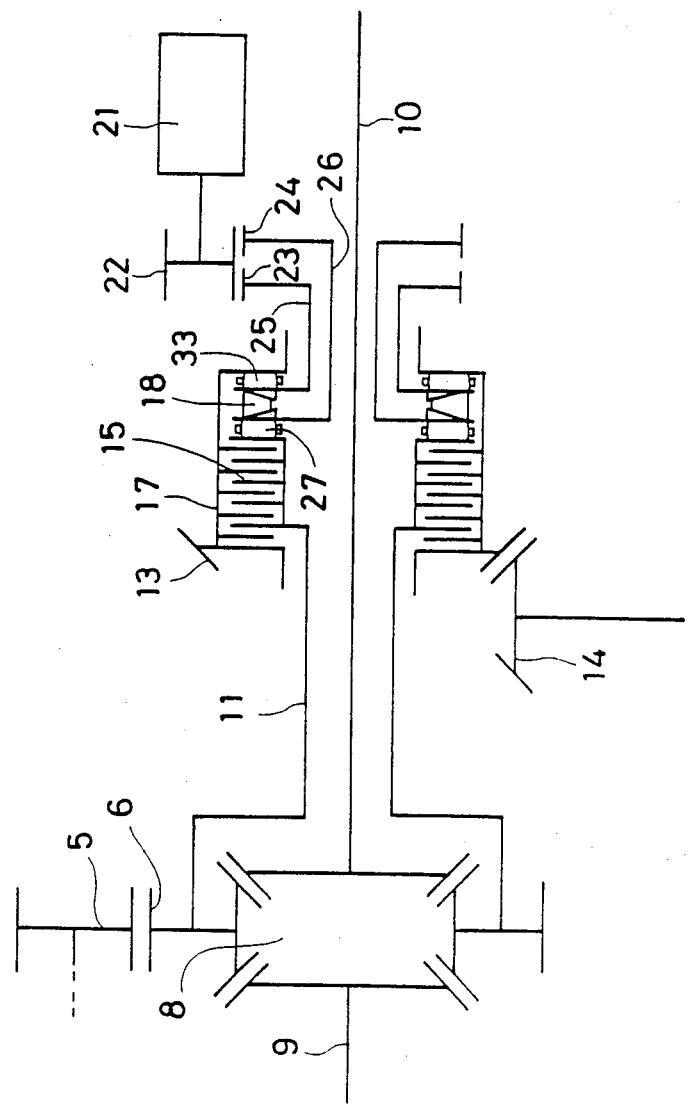
FIG. 6 shows an actuator in accordance with this invention as applied to a vehicle alternating between two-wheel and four-wheel drive.

FIG. 6 shows the actuator for a friction engagement device of this invention as utilized as the power transmission clutch for transmitting the driving force to the rear wheels of a four-wheel drive vehicle alternating between two-wheel and four-wheel drive. This embodiment differs from that of FIG. 1 in that the gear 22 connected to the motor 21 is formed as a long gear, the number of teeth being slightly different between the gears 23 and 24. This embodiment may be combined with those shown in FIGS. 2 through 4.

Figure 7:
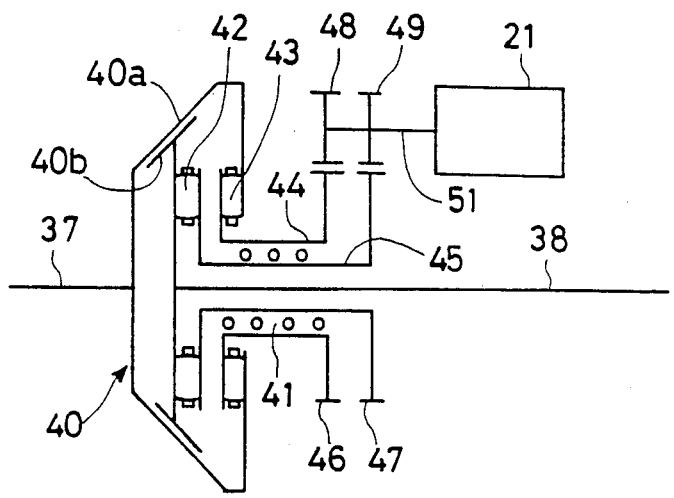
FIGS. 7 through 12 are schematic views showing other embodiments of the actuator in accordance with this invention.

It will be appreciated from FIG. 7 that the device in accordance with this invention can be utilized as the actuator not only for a multiple disc clutch, but also for friction clutches having other mechanisms. As shown in the drawing, a cone clutch 40 is employed as the power transmission clutch between shafts 37 and 38, the pressurizing force between the friction surfaces 40a and 40b of the cone clutch 40 being provided by the actuator of this invention. In this example, the ball screw type torque/thrust conversion mechanism of FIG. 3 is employed. The drawing further shows bearings 42 and 43, hollow shafts 44 and 45, and gears 46 through 49.

Figure 8:
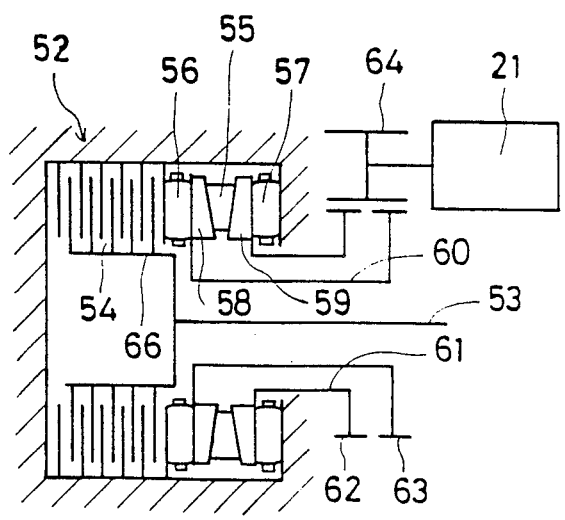

In the example shown in FIG. 8, the actuator in accordance with this invention is utilized as a braking actuator. The clutches shown in FIG. 1 and FIGS. 3 through 7 can also be used as braking devices by fixing either the input or the output shaft thereof. In this embodiment, a drum 52 is fixed, and a multiple disc friction brake 54 is provided between this drum and a hub 66 connected to a shaft 53, the pressurizing force for breaking being provided by cam mechanisms 55, 56 and 57. Since the rest of the actuator sections are of the same structure as those described above, an explanation thereof will be omitted here.

In the embodiments described above, a gear attached to the motor shaft is engaged with two gears which are respectively connected to two shafts, thereby converting the rotation of the motor into rotation of the two shafts with a slight respective rotational movement between them. The embodiments shown in FIGS. 7 to 12 have mechanisms different from the above. In the drawings, only those mechanisms are shown in which two shafts 66 and 67 rotate with a slight relative rotational movement.

Figure 9:
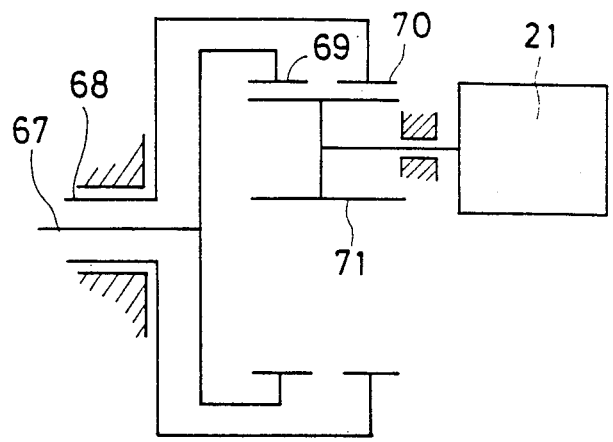

In the embodiment shown in FIG. 9, ring gears 69 and 70 having internal gear teeth are respectively connected to the shafts 67 and 68, a gear attached to the output shaft of the motor 21 being engaged with these ring gears from within.

Figure 10:
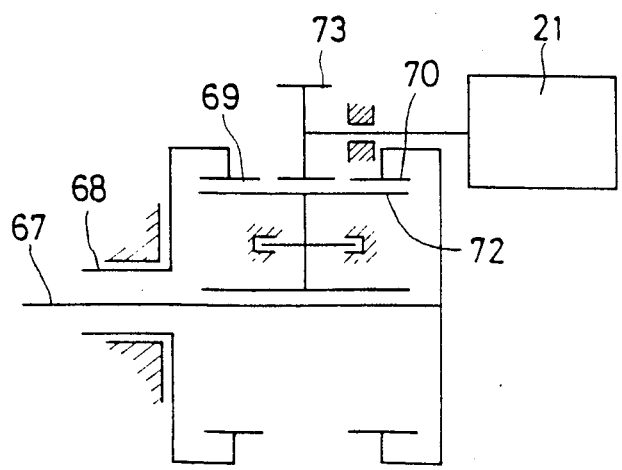

The embodiment shown in FIG. 10 also includes ring gears 69 and 70 having internal gears and connected to the shafts 67 and 68. It is, however, different from the embodiment shown in FIG. 9 in that the ring gears 69 and 70 connected to the shafts 67 and 68 are engaged with a gear 72, which is engaged with the shafts 67 and 68, on either side thereof, in such a manner as to enclose the end sections of the gear 72, a gear 73 attached to the output shaft of the motor being also engaged with the gear 72 at a position between the ring gears 69 and 70.

Figure 11:
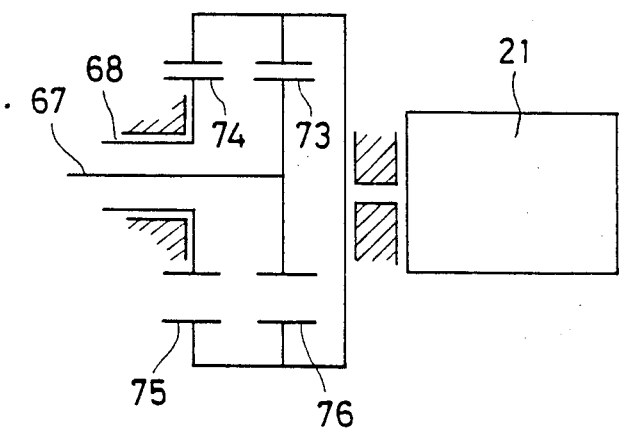

In the embodiment shown in FIG. 11, gears 73 and 74 having outer teeth are connected to the shafts 67 and 68, and a gear larger than gears 73 and 74 and having an inner teeth is attached to the shaft of the motor 21 in such a manner as to be decentered with respect to the shafts 67 and 68, the gears 73 and 74 being engaged with this gear from within. This arrangement makes it possible to position the motor 21 in alignment with the shaft 67.

Figure 12:
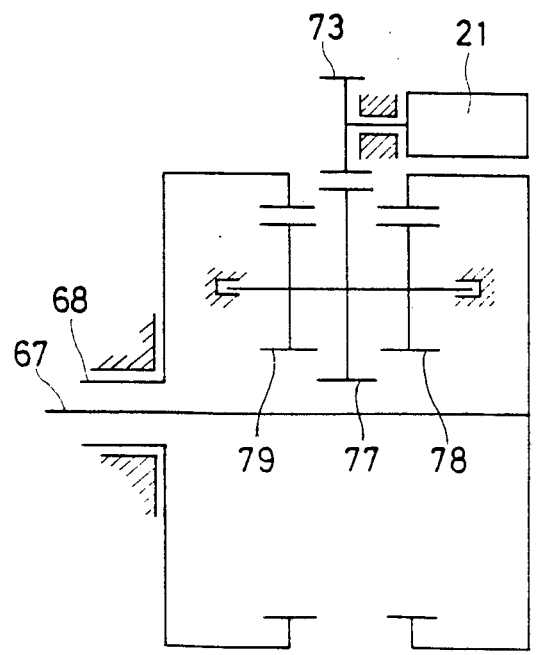
Figure 13:
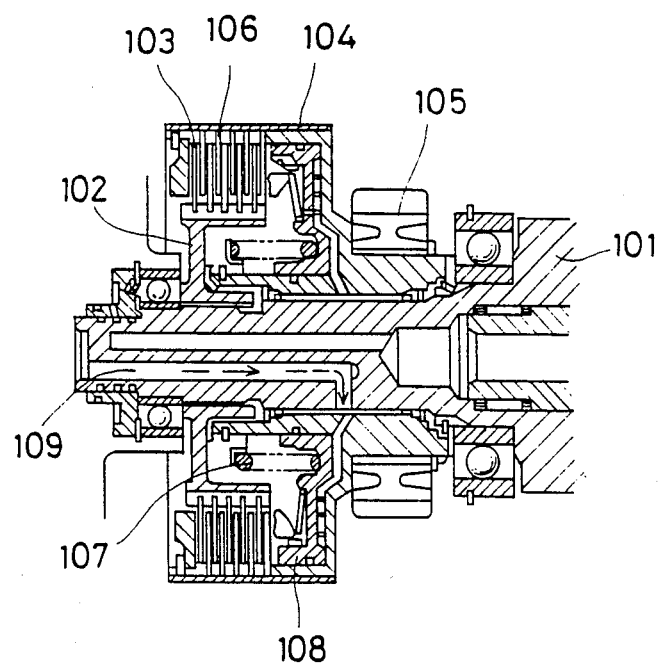
FIG. 13 is a sectional view showing a conventional actuator for a friction engagement device.

The embodiment shown in FIG. 12 is an improvement on that shown in FIG. 10. In this embodiment, the gear 72 shown in FIG. 10 is divided into three gears 77, 78 and 79. The gear 77 which is attached to the shaft of the motor 21 is larger than the other two, thereby effecting speed reduction at this section so as to obtain a larger speed reduction ratio. Thanks to this arrangement, the tangential force applied to the tooth surface of the ring gear may be relatively small when the driving force is input thereto.

As described above, the actuator in accordance with this invention can be applied to almost any type of friction engagement device.

What is claimed is:

1. An actuator for a friction engagement device adapted for distributing torque to front and rear wheels of a four-wheel drive vehicle, which comprises:
   a clutch connected between said front wheel and the rear wheel for controlling distribution of torque to said front and rear wheels,
   a fixed case enclosing said clutch,
   a torque generating mechanism gear having an electric motor immovably installed on an outer portion of said case, first and second gears coupled with an output shaft of said motor, and third and fourth gears respectively engaging said first and second gears for respectively providing a first and a second pair of gears, said first and second pair of gears having slightly different gear ratios for providing different torques,
   a torque-thrust force conversion means for converting a torque difference between two elements respectively connected with said third and fourth gears to a thrust force,
   a piston means for pressing said clutch in response to said thrust force output from said torque-thrust force conversion means, and
   a thrust bearing installed between said torque-thrust force conversion means and said piston means,
   wherein when said motor is activated, said clutch smoothly operates and controls said distribution of torque to said front and rear wheels.

2. The actuator for a friction engaging device according to claim 1, wherein said clutch is a center differential clutch for restricting differential operation of a center differential device which distributes torque to front and rear wheel side output members.

3. The actuator for a friction engaging device as claimed in claim 1, wherein said conversion means includes cam surfaces provided on said two elements, and a roller provided between said cam surfaces of said two elements.

4. The actuator for a friction engaging device as claimed in claim 1, wherein said conversion means includes a screw mechanism provided between said two elements.

5. The actuator for a friction engaging device as claimed in claim 1, wherein said torque generating mechanism gear includes a speed reduction mechanism.

6. The actuator for a friction engaging device as claimed in claim 1, wherein said conversion means includes a ball screw mechanism provided between said two elements.

7. The actuator for a friction engaging device as claimed in claim 1, wherein said two elements include a first hollow shaft arranged within a second hollow shaft, said first hollow shaft having a smooth outer surface and said second hollow shaft having a smooth inner surface.

8. A friction engagement device connecting front and rear wheels of a four-wheel drive vehicle, including a clutch for controlling the distribution of engine torque to said front and rear wheels, a fixed casing enclosing said clutch, and an actuator for said clutch, said actuator comprising:
   a torque generating mechanism gear having an electric motor immovably installed on an outer portion of said casing, first and second gears coupled with an output shaft of said motor, third and fourth gears respectively engaging said first and second gears for respectively providing a first and a second pair of gears, said first and second pair of gears having slightly different gear ratios for providing different torques,
   a torque-thrust force conversion means for converting a torque difference between two elements respectively connected to said third and fourth gears to a thrust force,
   a piston means for pressing said clutch in response to said thrust force output from said torque-thrust conversion means, and
   a thrust bearing installed between said torque-thrust force conversion means and said piston means,
   wherein when said motor is activated, said clutch smoothly operates and controls said distribution of torque to said front and rear wheels.

9. A device for controlling torque distribution between two output shafts, which comprises:
- a first output shaft means coupled to torque generating means for outputting a first rotational movement,
- a second output shaft means for outputting second rotational movement,
- a clutch contained with a fixed casing connecting said first and second output shaft means,
- actuator means for controlling said clutch, said actuator means including:
- a gear means for providing different torques, including an electric motor immovably installed on an outer portion of said casing, first and second gears coupled with an output shaft of said motor, and third and fourth gears respectively engaging said first and second gears for respectively providing a first and a second pair of gears having slightly different gear ratios for providing said different torques,
- conversion means for converting said torque difference to a thrust force between two elements respectively connected to said third and fourth gears,
- a connection means for pressing said clutch in response to said thrust force output from said conversion means,
- wherein said actuator means controls said clutch when said motor is activated by causing said clutch to transfer torque from said first output shaft means to said second output shaft means, so that both said first and second output shaft means respectfully output said first and second rotational movement together.

* * * * *